Figure 1:
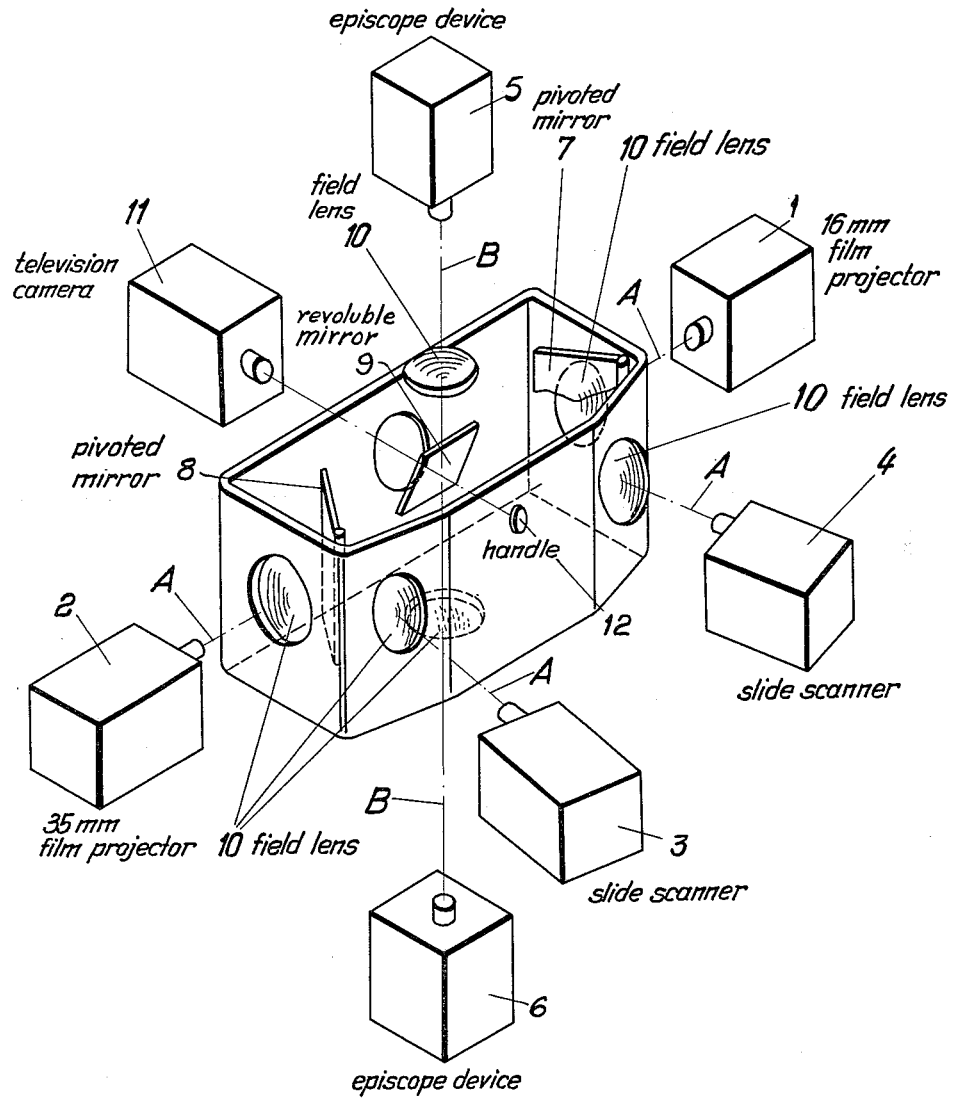

3,104,283
OPTICAL MULTIPLEXER
Rolf Möller, Darmstadt-Eberstadt, Germany, assignor to Fernseh G.m.b.H., Darmstadt, Germany
Filed Aug. 31, 1960, Ser. No. 53,171
Claims priority, application Germany Sept. 9, 1959
9 Claims. (Cl. 178—7.92)

This invention relates to an optical multiplexer for selectively establishing one of a plurality of possible optical paths between different image sources and a single television camera.

In the device known as an optical multiplexer one of a plurality of possible optical paths is established from one of a like plurality of image sources and a single television camera. As the image sources there may be employed for example film projectors, slide projectors or episcope devices. In known multiplexers the field lenses are so arranged that their centres lie approximately in a single plane. This arrangement suffers from the disadvantage that only relatively few picture sources can be accommodated. It is a major object of the present invention to provide a new apparatus which makes possible the use of a substantially increased number of image sources than was possible with the hitherto known types of optical multiplexers.

Another object of the present invention is to provide means for switching circuits of the associated image sources according to the particular operative position of the optical multiplexer.

According to the present invention there is provided an optical multiplexer comprising a plurality of field lenses and which serves for the selective establishment of an optical path from any one of a plurality of image sources to a single television camera, in which said field lenses are so disposed that the centres of some at least of said lenses lie approximately in a first plane and the centres of others of said lenses lie in at least one further plane, and comprising also a revoluble mirror arranged to effect deflection of said optical path from one to the other of said planes.

It is suitable so to arrange the field lenses of an optical multiplexer according to the invention that their centres lie approximately in two planes, one of which is arranged perpendicular to the other. The revoluble mirror is preferably coupled mechanically with a locating device by which the mirror may be secured against accidental movement in any one of a plurality of operative positions. Preferably the revoluble mirror has four operative positions separated from one another by multiples of 90°.

According to an extension of the invention an electric switch is mechanically coupled with the revoluble mirror of the multiplexer so that the switch is operated in at least one of the operative positions of the mirror. This switch may then be used to control the operation of a relay by means of which desirable changes may be made in the circuits associated with the television camera cooperating with the multiplexer. For example the switch-controlled relay may be used to invert the polarity of the current supplied to the vertical deflection coils for the pickup tube in the camera when an optical path is made operative which projects an inverted image on to the photosensitive member of the pickup tube. The relay may also be used to produce appropriate alterations in the circuits for spurious signal compensation and for shifting the position of the scanned area on the photocathode of the pickup tube.

Figure 2:
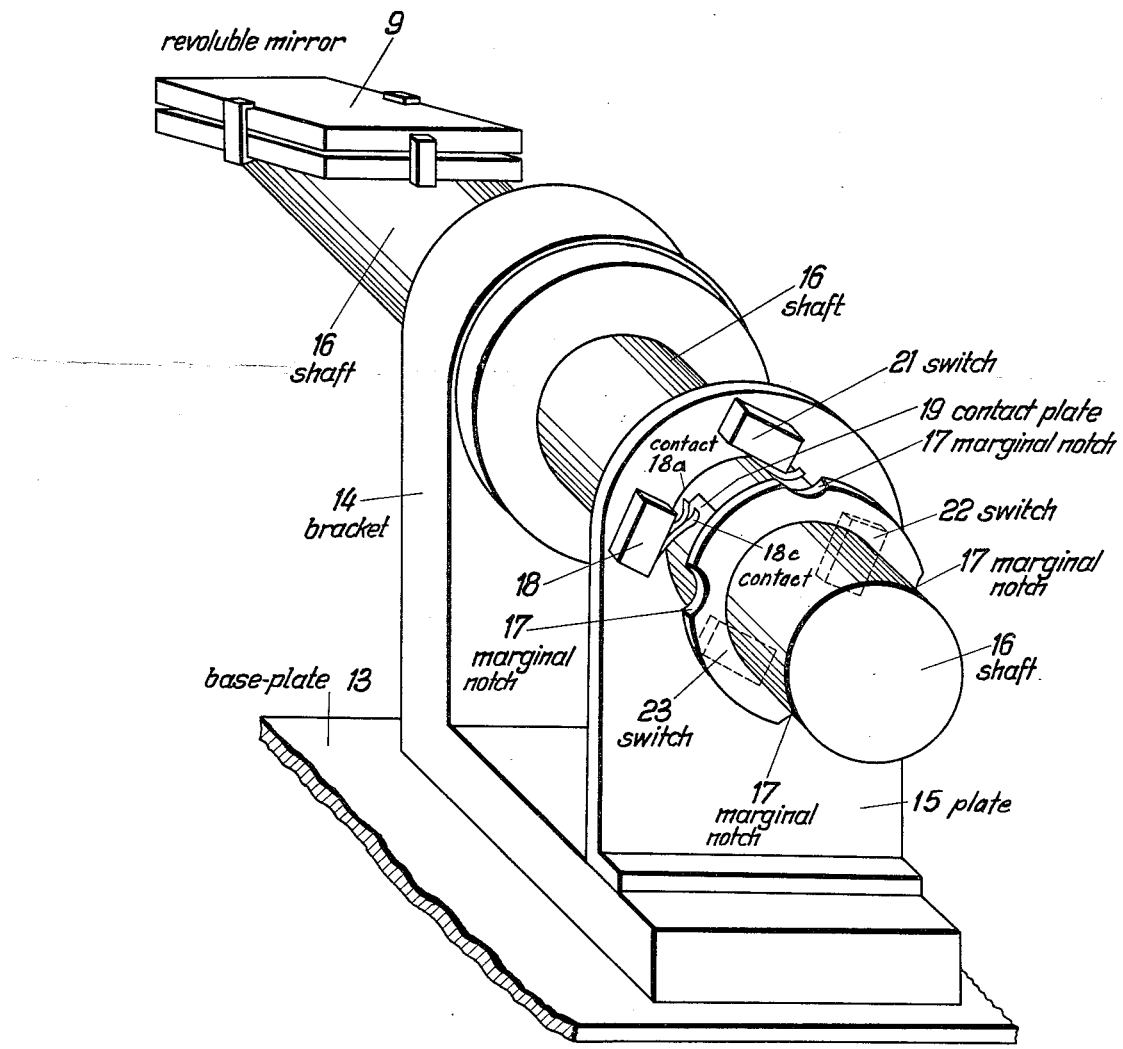

In what follows the invention is further described with reference to the accompanying drawings, comprising FIGURES 1 and 2, of which:

FIGURE 1 is a perspective schematic diagram illustrating one embodiment of an optical multiplexer in accordance with the present invention, and FIGURE 2 shows a detail of a switch-operating mechanism which may be used in an optical multiplexer according to the present invention.

FIGURE 1 shows schematically an optical multiplexer for selection among the six optical paths proceeding from a 16-mm. film projector 1, a 35-mm. film projector 2, two slide scanners 3 and 4 and two episcope devices 5 and 6 to a single television camera 11. This selection is effected as necessary by means of two pivoted mirrors 7 and 8 and by a revoluble mirror 9, fixedly located field lenses 10 being employed, the function of which is assumed in what follows to be self evident.

In the condition of adjustment of the multiplexer which is illustrated in FIGURE 1 the optical path proceeding from the episcope device 5 is deflected by the revoluble mirror 9 and conducted to the vidicon camera 11. The revoluble mirror 9 is arranged to be rotated by means of a handle 12 through any multiple of 90° into positions in which it is secured against accidental rotation by an associated locating device (not shown). If the handle 12 and the revoluble mirror 9 are rotated through 90° in the clockwise direction from the position shown in FIGURE 1, then instead of the optical path from the episcope device 5 being selected for transmission to camera 11, the optical path proceeding from the slide projector 4 will be conducted to the camera by way of the pivoted mirror 7, which is assumed to be in the position illustrated.

The deflection of the optical path between two mutually perpendicular planes is thus effected by the revoluble mirror 9. One of these planes is that containing the optical axes designated A of the film projectors 1, 2 and the slide projectors 3, 4. The other of the planes is that containing the optical axes designated B of the optical paths proceeding from the episcope devices 5 and 6, which paths may be deflected by the mirror 9 towards the camera 11. The pivoted mirrors 7 and 8 are thus made use of to deflect within one and the same plane the optical paths proceeding from the slide projectors 3 and 4.

The arrangement illustrated by FIGURE 2 is one possible means by which one or more switches may be operated as the revoluble mirror 9 attains its operative positions. A base-plate 13 forming part of the multiplexer carries a bracket 14 on which is mounted a plate 15. A bearing carried on bracket 14 secures a shaft 16 on the end of which is mounted the revoluble mirror 9. Shaft 16 is also provided with a collar having marginal notches 17 which cooperate with a spring-loaded locating device (not shown) to secure the mirror 9 against accidental movement in any one of four positions differing from one another by 90°.

When the revoluble mirror 9 is moved by manipulation of the handle 12 (see FIGURE 1) into the position illustrated, then on the one hand the optical path proceeding from the episcope device 5 of FIGURE 1 is conducted to the vidicon camera 11, and on the other hand contact 18a of a switch 18 (FIGURE 2) is connected with contact 18c of the switch by way of a contact plate 19 carried by, but preferably insulated from, shaft 16. When the circuit between contacts 18a and 18c is thus completed, current is supplied to the operating winding of a relay (not shown), so that the relay is actuated. When the relay is so actuated the polarity of the vertical deflection current supplied to the deflector coils associated with the pickup tube of camera 11 is inverted and corresponding alterations are made to the circuits providing the spurious signal compensating voltage and the circuits controlling the vertical position of the raster in the vidicon camera.

If the shaft 16 carrying the mirror 9 is turned in the clockwise direction into each of its four operating positions in turn, then contact plate 19 turns with it and in this manner makes connection between the contact springs of further switches 21, 22 and 23. In particular, when mirror 9 is rotated through 180° from the position illustrated in FIGURE 1, on the one hand the optical path proceeding from the episcope device 6 is deflected towards the vidicon camera 11 and on the other hand the switch 22 (see FIGURE 2) is closed and supplies current to the operating winding of a further relay (not shown) by means of which there may be effected an alteration of the target bias applied to the vidicon camera.

Whilst particular embodiments have been described, it will be understood that various modifications may be made without departing from the scope of the invention.

What is claimed as new and desired to be secured by Letters Patent is:

1. An optical multiplexer arrangement, comprising, in combination, a television camera having a main optical axis and including operation control means; a first group of image sources having first optical axes, respectively, all said first optical axes, respectively, being located substantially in a first plane containing also said main optical axis; at least one second group of image sources having second optical axes, respectively, all said second optical axes being located substantially in a second plane containing also said main optical axis; a single revoluble reflector located athwart said main optical axis at a predetermined point thereof and being selectively turnable into a plurality of positions respectively suitable for causing a ray of light traveling from any one of said image sources along the respective one of said first and second optical axes to be directed toward said television camera along said main optical axis thereof; and control means at least for selectively turning said reflector into any one of said positions thereof.

2. An optical multiplexer arrangement, comprising, in combination, a television camera having a main optical axis and including operation control means; a first group of image sources having first optical axes, respectively, all said first optical axes being located substantially in a first plane containing also said main optical axis; at least one second group of image sources having second optical axes, respectively, all said second optical axes being located substantially in a second plane containing also said main optical axis and intersecting said first plane substantially perpendicularly; a single revoluble reflector located athwart said main optical axis at a predetermined point thereof and being selectively turnable into a plurality of positions respectively suitable for causing a ray of light traveling from any one of said image sources along the respective one of said first and second optical axes to be directed toward said television camera along said main optical axis thereof; and control means at least for selectively turning said reflector into any one of said positions thereof.

3. An optical multiplexer arrangement, comprising, in combination, a television camera having a main optical axis and including operation control means; a first group of image sources having first optical axes, respectively, all said first optical axes being located substantially in a first plane containing also said main optical axis; at least one second group of image sources having second optical axes, respectively, all said second optical axes being located substantially in a second plane containing also said main optical axis and intersecting said first plane substantially perpendicularly; a single revoluble reflector located athwart said main optical axis at a predetermined point thereof and being selectively turnable into a plurality of positions substantially 90° spaced from one another and respectively suitable for causing a ray of light traveling from any one of said image sources along the respective one of said first and second optical axes to be directed toward said television camera along said main optical axis thereof; and control means at least for selectively turning said reflector into any one of said positions thereof and including positioning means for disengageably arresting said reflector in any one of said positions.

4. An optical multiplexer arrangement, comprising, in combination, a television camera having a main optical axis and including operation control means; a first group of image sources having first optical axes, respectively, all said first optical axes being located substantially in a first plane containing also said main optical axis; at least one second group of image sources having second optical axes, respectively, all said second optical axes being located substantially in a second plane containing also said main optical axis; a single revoluble reflector located athwart said main optical axis at a predetermined point thereof and being selectively turnable into a plurality of positions respectively suitable for causing a ray of light traveling from any one of said image sources along the respective one of said first and second optical axes to be directed toward said television camera along said main optical axis thereof; reflector means associated with at least one of said image sources of at least one of said groups thereof and positioned to reflect a ray of light traveling from said one of said image source along the respective one of said first and second optical axes toward said revoluble reflector so as to be reflected by the latter toward said television camera; and control means at least for selectively turning said revoluble reflector into any one of said positions thereof.

5. An optical multiplexer arrangement, comprising, in combination, a television camera having a main optical axis and including operation control means; a first group of image sources having first optical axes, respectively, all said first optical axes being located substantially in a first plane containing also said main optical axis; at least one second group of image sources having second optical axes, respectively, all said second optical axes being located substantially in a second plane containing also said main optical axis; a single revoluble reflector located athwart said main optical axis at a predetermined point thereof and being selectively turnable into a plurality of positions respectively suitable for causing a ray of light traveling from any one of said image sources along the respective one of said first and second optical axes to be directed toward said television camera along said main optical axis thereof; and control means for selectively turning said reflector into any one of said positions thereof, including switch means for influencing said operation control means of said television camera depending upon and in correlation with said turning of said reflector into said positions thereof, respectively.

6. An optical multiplexer arrangement, comprising, in combination, a television camera having a main optical axis and including operation control means; a first group of image sources having first optical axes, respectively, all said first optical axes being located substantially in a first plane containing also said main optical axis; at least one second group of image sources having second optical axes, respectively, all said second optical axes being located substantially in a second plane containing also said main optical axis; a single revoluble reflector located athwart said main optical axis at a predetermined point thereof and being selectively turnable into a plurality of positions respectively suitable for causing a ray of light traveling from any one of said image sources along the respective one of said first and second optical axes to be directed toward said television camera along said main optical axis thereof; and control means for selectively turning said reflector into any one of said positions thereof, including switch means and relay means controlled by said switch means for influencing said operation control means of said television camera depending upon and in correlation with said turning of said reflector into said positions thereof, respectively.

7. An optical multiplexer arrangement, comprising, in combination, a television camera having a main optical axis and including operation control means for inverting the polarity of the vertical deflection current in said television camera; a first group of image sources having first optical axes, respectively, all said first optical axes being located substantially in a first plane containing also said main optical axes; at least one second group of image sources having second optical axes, respectively, all said second optical axes being located substantially in a second plane containing also said main optical axis; a single revoluble reflector located athwart said main optical axis at a predetermined point thereof and being selectively turnable into a plurality of positions respectively suitable for causing a ray of light traveling from any one of said image sources along the respective one of said first and second optical axes to be directed toward said television camera along said main optical axis thereof; and control means for selectively turning said reflector into any one of said positions thereof, including switch means and relay means controlled by said switch means for actuating said operation control means of said television camera for inverting the polarity of the vertical deflection current in said television camera depending upon and in correlation with said turning of said reflector into at least one selected one of said positions thereof, respectively.

8. An optical multiplexer arrangement, comprising, in combination, a television camera having a main optical axis and including operation control means for inverting the polarity of the vertical deflection current and also for controlling the compensation of spurious signals and for shifting the scanned area in said television camera; a first group of image sources having first optical axes, respectively, all said first optical axes being located substantially in a first plane containing also said main optical axis; at least one second group of image sources having second optical axes, respectively, all said second optical axes being located substantially in a second plane containing also said main optical axis; a single revoluble reflector located athwart said main optical axis at a predetermined point thereof and being selectively turnable into a plurality of positions respectively suitable for causing a ray of light traveling from any one of said image sources along the respective one of said first and second optical axes to be directed toward said television camera along said main optical axis thereof; and control means for selectively turning said reflector into any one of said positions thereof, including switch means and relay means controlled by said switch means for actuating said operation control means of said television camera for inverting the polarity of the vertical deflection current in said television camera and also for controlling the compensation of spurious signals and for shifting the scanned area depending upon and in correlation with said turning of said reflector into at least one selected one of said positions thereof, respectively.

9. An optical multiplexer arrangement, comprising, in combination, a television camera having a main optical axis and including operation control means for altering the target bias voltage applied to the tube of said camera; a first group of image sources having first optical axes, respectively, all said first optical axes being located substantially in a first plane containing also said main optical axis; at least one second group of image sources having second optical axes, respectively, all said second optical axes being located substantially in a second plane containing also said main optical axis; a single revoluble reflector located athwart said main optical axis at a predetermined point thereof and being selectively turnable into a plurality of positions respectively suitable for causing a ray of light traveling from any one of said image sources along the respective one of said first and second optical axes to be directed toward said television camera along said main optical axis thereof; and control means for selectively turning said reflector into any one of said positions thereof, including switch means and relay means controlled by said switch means for actuating said operation control means of said television camera so as to alter the target bias voltage applied to the tube of said camera depending upon and in correlation with said turning of said reflector into at least one selected one of said positions thereof, respectively.

References Cited in the file of this patent
UNITED STATES PATENTS

| | | |
|---|---|---|
| 2,745,901 | Owens | May 15, 1956 |
| 2,784,248 | Rackett | Mar. 5, 1957 |